US006945754B2

(12) United States Patent
DiBella

(10) Patent No.: US 6,945,754 B2
(45) Date of Patent: Sep. 20, 2005

(54) METHODS AND APPARATUS FOR DESIGNING GAS TURBINE ENGINE ROTOR ASSEMBLIES

(75) Inventor: Joseph John DiBella, West Roxbury, MA (US)

(73) Assignee: General Electric Company, Schenectady, NY (US)

( * ) Notice: Subject to any disclaimer, the term of this patent is extended or adjusted under 35 U.S.C. 154(b) by 133 days.

(21) Appl. No.: 10/447,817

(22) Filed: May 29, 2003

(65) Prior Publication Data

US 2004/0241001 A1 Dec. 2, 2004

(51) Int. Cl.$^7$ ................................. F01D 5/30
(52) U.S. Cl. ................. 416/219 R; 416/248
(58) Field of Search ............... 416/215, 218, 416/219 R, 220 R, 248

(56) References Cited

U.S. PATENT DOCUMENTS

| | | | |
|---|---|---|---|
| 3,053,504 A | * | 9/1962 | Shelly ................... 416/215 |
| 3,784,320 A | * | 1/1974 | Rossmann et al. ......... 416/215 |
| 4,215,412 A | | 7/1980 | Bernier et al. |
| 5,080,496 A | | 1/1992 | Keim et al. |
| 5,183,389 A | | 2/1993 | Gilchrist et al. |
| 5,310,317 A | | 5/1994 | Bailey et al. |
| 5,489,829 A | | 2/1996 | Umida |
| 5,494,408 A | | 2/1996 | Seeley et al. |
| 5,622,475 A | | 4/1997 | Hayner et al. |
| 5,689,066 A | | 11/1997 | Stevenson |
| 5,726,891 A | | 3/1998 | Sisson et al. |
| 5,842,831 A | * | 12/1998 | Galke et al. ............ 416/95 |
| 6,033,185 A | | 3/2000 | Lammas et al. |
| 6,539,783 B1 | | 4/2003 | Adibhatla |

* cited by examiner

*Primary Examiner*—Ninh H. Nguyen
(74) *Attorney, Agent, or Firm*—William Scott Andes; Armstrong Teasdale LLP

(57) ABSTRACT

A method enables a rotor assembly for a gas turbine engine to be designed. The method comprises providing a plurality of rotor blades that each include a dovetail that includes a pair of blade pressure faces and a dovetail bottom that extends arcuately between the pair of blade pressure faces, providing at least one of a rotor disk and a rotor spool that includes a circumferential dovetail slot that is sized to receive the plurality of rotor blades therein, and coupling the plurality of rotor blades to the at least one of a rotor disk and a rotor spool using each respective rotor blade dovetail.

17 Claims, 3 Drawing Sheets

METHODS AND APPARATUS FOR DESIGNING GAS TURBINE ENGINE ROTOR ASSEMBLIES

BACKGROUND OF THE INVENTION

This application relates generally to gas turbine engines and, more particularly, to methods and apparatus for assembling gas turbine engine rotor assemblies.

At least some known gas turbine engines include a compressor for compressing air which is mixed with a fuel and channeled to a combustor wherein the mixture is ignited within a combustion chamber for generating hot combustion gases. The hot combustion gases are channeled downstream to a turbine, which extracts energy from the combustion gases for powering the compressor, as well as producing useful work to propel an aircraft in flight or to power a load, such as an electrical generator.

Known compressors include a rotor assembly that includes at least one row of circumferentially spaced rotor blades. Each rotor blade includes an airfoil that includes a pressure side, and a suction side connected together at leading and trailing edges. Each airfoil extends radially outward from a rotor blade platform. Each rotor blade also includes a dovetail that extends radially inward from the platform, and is used to mount the rotor blade within the rotor assembly to a rotor disk or spool. More specifically, at least some known rotor disks include a circumferential dovetail slot that is sized to receive the plurality of rotor blades therein.

Known rotor blade dovetails are generally shaped complementary to the disk dovetail slot to enable the rotor blade dovetails and the rotor disk slot to mate together and form a dovetail assembly. The blade dovetails each include at least one pair of tangs that extend to a substantially planar dovetail bottom extending between the dovetail tangs. The rotor blade dovetail tangs are received within corresponding disk slot tangs.

During operation, the rotor blade dovetails and the chamfered dovetail tangs may be subjected to compressive loading. More specifically, the compressive loading may cause bending stresses to be induced into the rotor blades from the dovetails. To facilitate reducing such bending stresses, at least some known rotor blades are fabricated to have tight tolerances defined between the rotor blade dovetail and the dovetail slot. However, because of space and weight considerations, not all rotor assemblies can be assembled within a respective gas turbine engine using axial dovetail slots.

BRIEF SUMMARY OF THE INVENTION

In one aspect, a method for assembling a rotor assembly for a gas turbine engine is provided. The method comprises providing a plurality of rotor blades that each include a dovetail that includes a pair of blade pressure faces and a dovetail bottom that extends arcuately between the pair of blade pressure faces, providing at least one of a rotor disk and a rotor spool that includes a circumferential dovetail slot that is sized to receive the plurality of rotor blades therein, and coupling the plurality of rotor blades to the at least one of a rotor disk and a rotor spool using each respective rotor blade dovetail.

In another aspect, a dovetail assembly for a gas turbine engine is provided. The dovetail assembly includes a plurality of rotor blades and a disk. Each of the rotor blades includes a dovetail including a dovetail bottom and at least a pair of blade pressure faces. The dovetail bottom extends arcuately between the at least a pair of blade pressure faces. The disk includes a circumferential dovetail slot that is sized to receive the plurality of rotor blade dovetails. The dovetail slot is defined by at least one pair of opposing disk tangs.

In a further aspect, a gas turbine engine including a rotor assembly including a plurality of rotor blades coupled to a rotor disk is provided. The plurality of rotor blades each include an airfoil, a dovetail, and a platform extending therebetween. Each dovetail includes at least a pair of blade pressure faces and a dovetail bottom extending arcuately therebetween. The rotor disk includes a circumferential dovetail slot sized to receive the plurality of rotor blade dovetails.

DETAILED DESCRIPTION OF THE INVENTION

Figure 1:
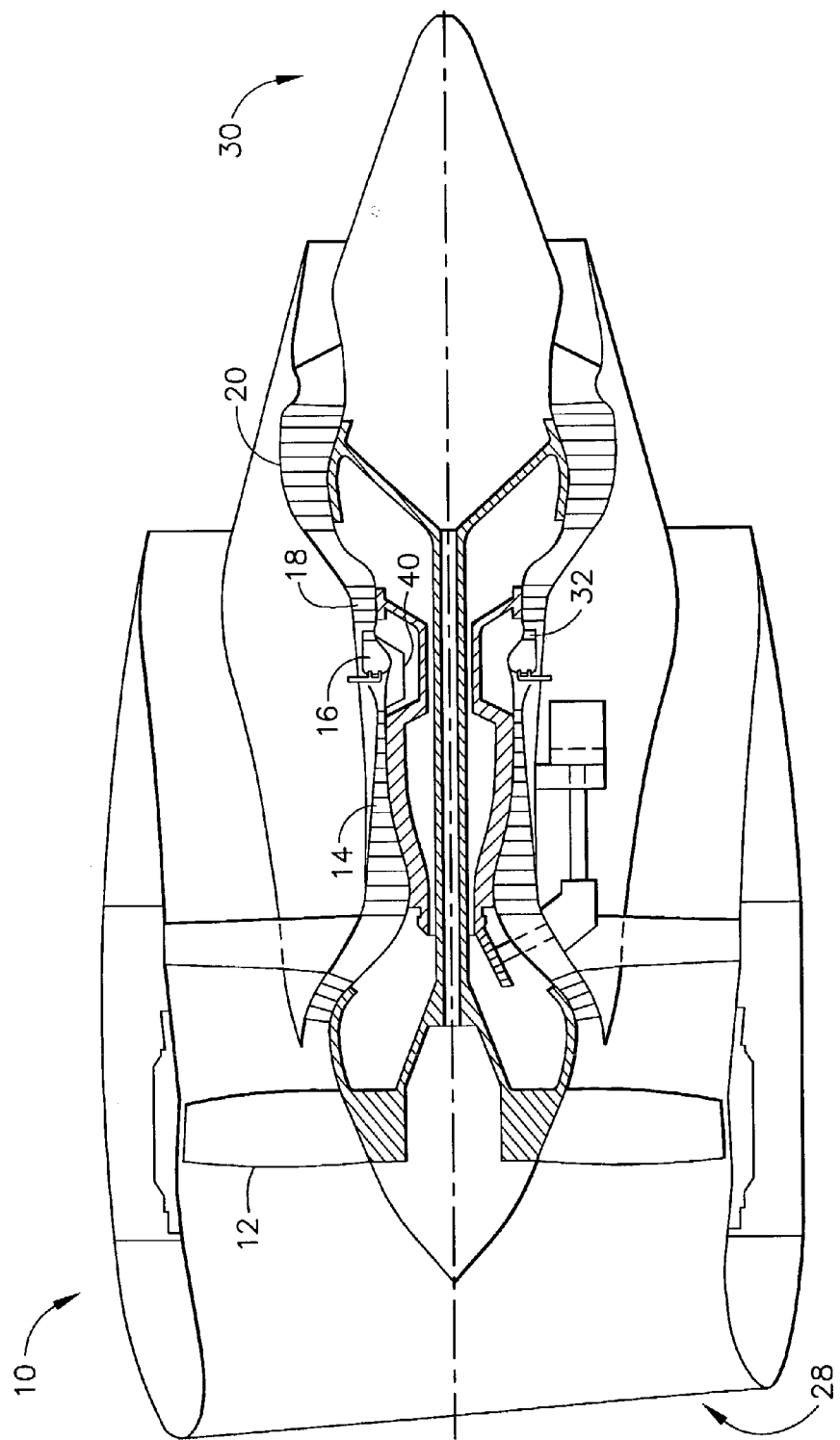
FIG. 1 is schematic illustration of a gas turbine engine.

FIG. 1 is a schematic illustration of a gas turbine engine 10 including, in serial flow arrangement, a fan assembly 12, a high-pressure compressor 14, and a combustor 16. Engine 10 also includes a high-pressure turbine 18 and a low-pressure turbine 20. Engine 10 has an intake side 28 and an exhaust side 30. In one embodiment, engine 10 is a CF-34 engine commercially available from General Electric Aircraft Engines, Cincinnati, Ohio.

In operation, air flows through fan assembly 12 and compressed air is supplied to high-pressure compressor 14. The highly compressed air is delivered to combustor 16. Airflow from combustor 16 is directed to drive turbines 18 and 20, and turbine 20 drives fan assembly 12. Turbine 18 drives high-pressure compressor 14.

Figure 2:
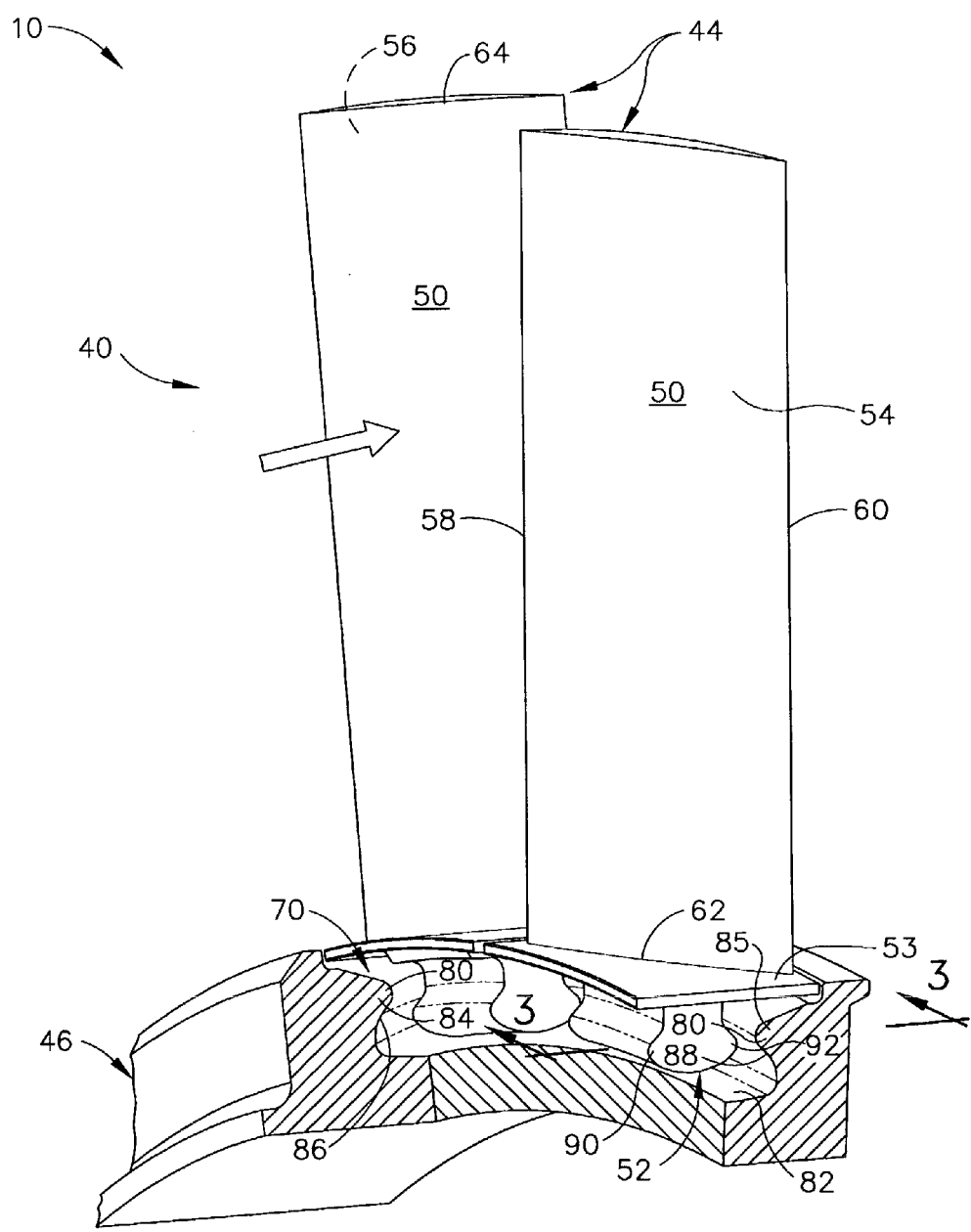
FIG. 2 is a perspective view of a portion of a rotor assembly that may be used with the gas turbine engine shown in FIG. 1.
Figure 3:
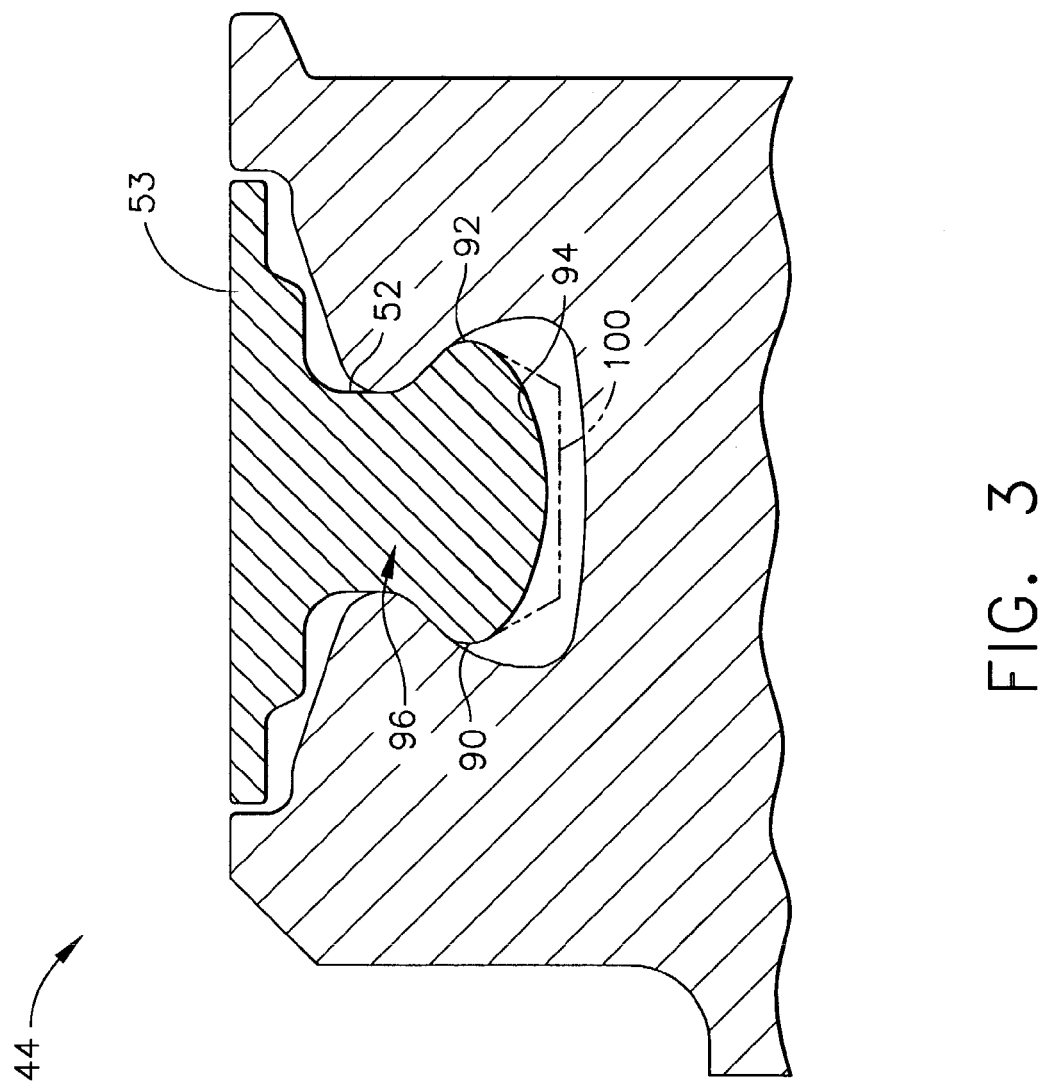
FIG. 3 is an enlarged axial cross-sectional view of a rotor blade used with the rotor assembly shown in FIG. 2 and taken along line 3—3 (shown in FIG. 2).

FIG. 2 is a perspective view of a portion of a rotor assembly 40 that may be used with gas turbine engine 10. FIG. 3 is an enlarged axial cross-sectional view of a portion of a rotor blade 44 used with rotor assembly 40 and taken along line 3—3 (shown in FIG. 2). Rotor assembly 40 includes a disk assembly 42 including a plurality of rotor blades 44 mounted within a rotor disk 46 and extend radially outward from disk 46. In an alternative embodiment, rotor blades 44 are mounted within a rotor spool. More specifically, in the exemplary embodiment, a plurality of rotor blades 44 form a rotor stage (not shown) of a compressor, such as compressor 14 (shown in FIG. 1).

Each rotor blade 44 includes an airfoil 50 and an integral dovetail 52 used for mounting each respective airfoil 50 to rotor disk 46. More specifically, each airfoil 50 extends radially outward from a platform 53 that extends between dovetail 52 and airfoil 50. Each airfoil 50 includes a first contoured side wall 54 and a second contoured side wall 56. First side wall 54 defines a suction side of airfoil 50, and second side wall 56 defines a pressure side of airfoil 50. Side walls 54 and 56 are joined at a leading edge 58 and at an axially-spaced trailing edge 60 of airfoil 50. More specifically, airfoil trailing edge 60 is spaced chordwise and downstream from airfoil leading edge 58. First and second side walls 54 and 56, respectively, extend longitudinally or radially outward in span from a blade root 62 positioned adjacent dovetail 52, to an airfoil tip 64.

Rotor disk 46 includes a circumferential dovetail slot 70 defined in the perimeter thereof. Slot 70 extends substantially circumferentially around rotor disk 46 and is sized to receive a plurality of circumferentially adjoining rotor blades 44 therein, such that blades 44 are removably mounted within disk slot 70 by each respective blade dovetail 52. More specifically, slot 70 is shaped to generally compliment a shape of each dovetail 52 received therein, and accordingly, in the exemplary embodiment, includes a pair of disk tangs 80 and a disk slot bottom 82 that extends between disk tangs or lobes 80. Disk tangs 80 are defined by a continuous forward disk post 84 and a continuous aft disk post 85. In the exemplary embodiment, disk slot 70 also includes a pair of opposed disk pressure faces 86 and 88. In an alternative embodiment, slot 70 includes additional tangs 80 and pressure faces 86 and 88.

Each blade dovetail 52 is mounted within dovetail slot 70, and cooperates with dovetail slot 70, to form disk assembly 42. In the exemplary embodiment, each dovetail includes a pair of opposed blade pressure faces 90 and 92, and a dovetail bottom 94 that extends between pressure faces 90 and 92. A dovetail neck 96 extends axially between dovetail pressure faces 90 and 92. Pressure faces 90 and 92 are sized to be received within respective disk tangs 80 and engage disk slot 70 and posts 84 and 85, such that blades 44 are radially retained within disk 46. In an alternative embodiment, each blade dovetail includes more than a pair of disk tangs 80.

Dovetail bottom 94 extends arcuately in a continues and smooth curvature between blade pressure faces 90 and 92. More specifically, dovetail bottom 94 has a funicular contour extending axially between tangs 90 and 92. The shape of bottom 94 is determined empirically based on dovetail loading. More specifically, the anticipated dovetail neck 96 loading distribution is applied to a very flexible beam using a finite element analysis. The resultant deflected shape under these applied loads is a funicular curve that defines the shape used to define the shape of dovetail bottom 94. Accordingly, dovetail bottom 94 has a smaller cross-sectional profile than a conventional rotor blade dovetail 100 (shown in phantom in FIG. 3). More specifically, dovetail bottom 94 is formed with less material than conventional dovetails 100 and as such, facilitates reducing an overall weight of rotor assembly 40 and gas turbine engine 10 in comparison to conventional dovetails 100.

During operation, centrifugal forces force rotor blades 44 outward and induce compressive loading to dovetail bottom 94. The funicular shape of dovetail bottom 94 facilitates transferring compressive loads from dovetail bottom 94 to pressure faces 86 and 88. Accordingly, bending stresses induced to rotor blades 44 and dovetail 52 are facilitated to be reduced in comparison to those stresses that may be induced by conventional dovetails 100 under similar operating conditions. As a result, the combination of the funicular shape and decreased weight of dovetail bottom 52 facilitates extending a useful life of rotor assembly 40 with a corresponding increasing in the fatigue life of each respective blade 44.

The above-described dovetail provides a cost-effective and highly reliable method for coupling rotor blades to a rotor disk such that loading induced to the rotor disk is reduced during operation. More specifically, the dovetail bottom is funicular shaped and extends arcuately between a pair of opposing blade pressure faces. The funicular shape enables the rotor blade to be fabricated with less material than conventional blades, and facilitates transferring compressive loads induced to the blade to the dovetail slot pressure faces. Accordingly, bending stresses induced to the dovetail are also facilitated to be reduced. As a result, the dovetail bottom facilitates extending a useful life of the rotor assembly and improving the operating efficiency of the gas turbine engine in a cost-effective and reliable manner.

Exemplary embodiments of rotor assemblies are described above in detail. The rotor assemblies are not limited to the specific embodiments described herein, but rather, components of each assembly may be utilized independently and separately from other components described herein. Each rotor component can also be used in combination with other rotor assembly components.

While the invention has been described in terms of various specific embodiments, those skilled in the art will recognize that the invention can be practiced with modification within the spirit and scope of the claims.

What is claimed is:

1. A method for designing a rotor assembly for a gas turbine engine, said method comprising:
   providing a plurality of rotor blades that each include a dovetail that includes a pair of blade pressure faces and a dovetail bottom that extends arcuately between the pair of blade pressure faces, wherein each dovetail bottom is funicular-shaped;
   providing at least one of a rotor disk and a rotor spool that includes a circumferential dovetail slot that is sized to receive the plurality of rotor blades therein; and
   coupling the plurality of rotor blades to the at least one of a rotor disk and a rotor spool using each respective rotor blade dovetail.

2. A method in accordance with claim 1 wherein coupling the plurality of rotor blades to the at least one of a rotor disk and a rotor spool using each respective rotor blade dovetail further comprises coupling the plurality of rotor blades to the at least one of a rotor disk and a rotor spool to facilitate minimizing bending stresses induced to each respective rotor blade during engine operation.

3. A method in accordance with claim 1 wherein coupling the plurality of rotor blades to the at least one of a rotor disk and a rotor spool using each respective rotor blade dovetail further comprises coupling the plurality of rotor blades to the at least one of a rotor disk and a rotor spool to facilitate extending a useful life of the at least one of a rotor disk and a rotor spool.

4. A method in accordance with claim 1 wherein providing a plurality of rotor blades that each include a dovetail that includes a pair of blade pressure faces further comprises providing a plurality of rotor blades that include a pair of symmetrically opposed dovetail blade pressure faces.

5. A dovetail assembly for a gas turbine engine, said dovetail assembly comprising:
   a plurality of rotor blades, each said rotor blade comprising a dovetail comprising a dovetail bottom and at least a pair of blade pressure faces, said dovetail bottom extends arcuately between said at least a pair of blade pressure faces, wherein said rotor blade dovetail bottom is funicular-shaped; and
   a disk comprising a circumferential dovetail slot sized to receive said plurality of rotor blade dovetails, said dovetail slot defined by at least one pair of opposing disk tangs.

6. A dovetail assembly in accordance with claim 5 wherein each said rotor blade comprises a pressure side and a suction side, said dovetail bottom extends between said rotor blade pressure and suction sides.

7. A dovetail assembly in accordance with claim 5 wherein each said rotor blade dovetail bottom facilitates minimizing bending stresses induced to each said respective rotor blade during engine operation.

8. A dovetail assembly in accordance with claim 5 wherein each said rotor blade dovetail bottom facilitates reducing an overall weight of the gas turbine engine.

9. A dovetail assembly in accordance with claim 5 wherein each said rotor blade dovetail bottom facilitates extending a useful life of said disk.

10. A dovetail assembly in accordance with claim 5 wherein said rotor blade at least a pair of blade pressure faces are symmetrically opposed.

11. A gas turbine engine comprising a rotor assembly comprising a plurality of rotor blades coupled to a rotor disk, said plurality of rotor blades each comprising an airfoil, a dovetail, and a platform extending therebetween, each said dovetail comprises at least a pair of blade pressure faces and a dovetail bottom extending arcuately therebetween, wherein each said rotor blade dovetail bottom is funicular-shaped, said rotor disk comprising a circumferential dovetail slot sized to receive said plurality of rotor blade dovetails.

12. A gas turbine engine in accordance with claim 11 wherein each said rotor blade comprises a pressure side and a suction side, said dovetail bottom extends between said rotor blade pressure and suction sides.

13. A gas turbine engine in accordance with claim 12 wherein each said rotor blade at least a pair of blade pressure faces are symmetrically opposed.

14. A gas turbine engine in accordance with claim 12 wherein each said rotor blade dovetail bottom is configured to facilitate minimizing stresses induced to each said rotor blade during engine operation.

15. A gas turbine engine in accordance with claim 12 wherein each said rotor blade dovetail bottom facilitates extending a useful life of said disk.

16. A gas turbine engine in accordance with claim 12 wherein each said rotor blade dovetail bottom facilitates reducing an overall weight of said gas turbine engine.

17. A gas turbine engine in accordance with claim 12 wherein said rotor assembly is a compressor rotor assembly.

* * * * *